United States Patent [19]

Zwirn

[11] 4,124,865

[45] Nov. 7, 1978

[54] AUTOMATIC RETICLE DETECTION AND TRACKING METHOD AND SYSTEM

[75] Inventor: Robert Zwirn, Los Angeles, Calif.

[73] Assignee: Hughes Aircraft Company, Culver City, Calif.

[21] Appl. No.: 857,621

[22] Filed: Dec. 5, 1977

Related U.S. Application Data

[63] Continuation of Ser. No. 747,747, Dec. 6, 1976, abandoned.

[51] Int. Cl.² .............................................. H04N 7/18
[52] U.S. Cl. ............................... 358/126; 250/203 CT; 350/110
[58] Field of Search ............... 358/96, 107, 125, 126; 250/203 CT; 350/110

[56] References Cited

U.S. PATENT DOCUMENTS

| 3,175,089 | 3/1965 | Talley | 358/107 |
| 3,699,380 | 10/1972 | Alpers | 358/126 |
| 3,725,576 | 4/1973 | Crawford | 358/126 |
| 3,988,534 | 10/1976 | Sacks | 358/126 |

*Primary Examiner*—Howard W. Britton

*Attorney, Agent, or Firm*—Lawrence V. Link, Jr.; W. H. MacAllister

[57] ABSTRACT

A reticle superimposed upon an observation scene is detected by electronically discriminating the reticle from the rest of the observation scene to thereby define a coordinate system. The reticle is identified in an observation scene by recognizing that all reticle signal return elements fall on a straight line, that each reticle return will have a substantially uniform amplitude or pulse height, and that each reticle will have a predetermined predictable line thickness or pulse width. The discriminating system and method utilized first gates the video to detect returns within only selected portions of the observation scene. The "blackest" level within each video gate is then determined and a reference level close to it is established. All signals below the reference level are then purged. Finally, the pulse width of each resultant signal and its associated location within each sensor sweep is determined and tested for correlation with the resultant signals of a plurality of sequential sensor sweeps. Azimuth and elevation reticle locations are defined when such correlation exists.

15 Claims, 9 Drawing Figures

AUTOMATIC RETICLE DETECTION AND TRACKING METHOD AND SYSTEM

The Government has rights in this invention pursuant to Contract No. DAAA25-76-C-0129, awarded by the Department of the Army.

CROSS REFERENCE TO A RELATED APPLICATION

This is a continuation of application Ser. No. 747,747, filed Dec. 6, 1976, now abandoned.

BACKGROUND OF THE INVENTION

1. Field of the Invention

The present invention relates to methods and apparatus for aligning a sighting coordinate system with the tracking coordinate system. More specifically, the present invention provides methods and apparatus for automatically tracking the reticle in a sighting system to allow the boresight coordinate system of a tracker to be slaved thereto.

2. Prior Art

In a video tracking system, such as a TV system, the video sensor is generally swept in an azimuth direction across a field of view to generate a plurality of video sweep signals. A number of these sweeps slightly offset in elevation from every other sweep may be combined to form a composite observation scene image and particular objects within that scene may be detected and tracked as potential targets. However, in tracking video from an optical site, the video return generally contains not only observation scene information but also etched, hot wire, or some other type reference reticle image. In general, the reticles so superimposed are aligned to form the basis of the tracker's internal coordinate system. One problem in such a system, however, is that the etched reticle on the optics does not correspond to the electronic reticles of the tracking system. It was thus necessary in prior systems to align the coordinate system defined by the reticles of the optics with the electronic reticles of the tracking system. In prior systems, the alignment process to make the two reference reticle systems coincide was accomplished by referencing the tracker coordinate system to the TV sweep control ramp which was initially preset to coincide with the etched reticles. While misalignments did occur utilizing such techniques, these misalignments were small and were not critical since targets subtended many sensor sweep lines and the operator could correct any misalignment errors utilizing tracer bullets.

In modern systems where lasers are utilized to guide weapons to specified targets, it is necessary that much greater accuracy be achieved. In such modern systems, a laser first illuminates a target and a weapon then senses and is guided to that illuminated region. The problem is that the laser light may not be in the sensor's (e.g., T.V., forward looking infrared, long wavelength infrared, etc.) spectrum thus making it impossible for the operator to tell the exact spot which the laser is actually illuminating as was possible utilizing tracer bullets and the like. In addition, even if very accurate periodic alignment were possible temperature drifts in the display, the TV sensor camera, and other display systems, as well as servo errors and human alignment or sighting errors would still exist. Indeed, such errors could vary significantly between the periodic alignments, thereby causing significant laser pointing errors.

In view of the fact that no pointing accuracy measure is fed back to the operator via tracer bullets and the like in these type systems, it is essential that misalignment errors be eliminated in an efficient and economical way to allow high accuracy tracking so that a specified target may be continuously illuminated. All alignment systems heretofore utilized have been open-loop type systems requiring periodic alignment. The present invention provides methods and apparatus for continuously determining the location of optical reticles to allow a closed loop feedback system to provide continuous alignment between the tracker coordinate system and the sighting coordinate system defined by the optical reticles. The present reticle locating method and apparatus also permits other functions including electronic reticle blanking and display system drift compensation.

SUMMARY OF THE INVENTION

In a video scanning system which incorporates a sequential interrogation scheme for reading and processing information from a plurality of picture element locations (also referred to herein as pixel locations), such as a scanning TV camera, electronic scanning in a CCD sensor array, forward looking infrared, sensors, etc., a video signal is generated which contains not only observation scene information but also an image of a reticle which represents the system boresight reference. Because the tracker operates on the entire video return signal, the image of the reticle which is superimposed on the observation scene must be taken into account to allow a common coordinate system to be defined for the sighting and tracking system and to assure that the reticles are not detected and tracked as a target. The present invention utilizes the distinctive characteristics of the sighting reticle to thereby recognize, locate, and automatically track the reticle and thus provide a boresight reference for the tracker. In addition, the reticle location established may be utilized as a means of controlling drifts in the electronic scanning of the TV camera or as a means of generating signals which are time-coincident with the reticle signals to allow reticle blanking.

In the preferred embodiment of the present invention, the task of locating the reticle is accomplished by first establishing a search domain within the observation scene preferably having the same shape as the reticle with a thickness somewhat larger than the reticle position uncertainty to assure that the reticle will be detected. The present invention then discriminates the reticles utilizing the unique characteristic that all the reticle return signals or elements will fall on a straight line (i.e., spatial correlation), that each reticle signal return will have a uniform pulse height or amplitude, and that each reticle return signal will have a predictable line thickness or pulse width.

Apparatus is thus provided to first identify all video signals having a uniform amplitude. For example, if the reticle is etched, it will be opaque resulting in a uniform, low amplitude signal. This uniform amplitude detection is accomplished utilizing a negative peak detector to determine the blackest level (lowest amplitude level) within the search gate and define a voltage above that level which is the input to a threshold circuit. The threshold circuit then eliminates all video returns having an amplitude above the defined voltage threshold to thereby generate a processed signal having enabling regions or periods representing the low amplitude regions of the video-gated signal.

The present invention next provides apparatus to determine the pulsewidth of the enabling regions in the processed signals. For a reticle having a direction perpendicular to the direction of video sweep, a clock signal from a digital clock activates a counter during the duration of each enabling region. If the total clock pulse count accumulated in less than a predetermined number, the pulsewidth test is passed and the sweep or pixel location address of the particular enabling region is stored for comparison with any subsequent enabling region address. If on the next sweep an enabling region having a pulsewidth less than some minimum number of clock counts is identified and the sweep location address is substantially the same as that of the previous enabling region sweep location address, the average address of the two is determined and stored. On the other hand, if the sweep or pixel location address is significantly different from that of the previous sweep, both enabling regions fail correlation and any resultant addresses generated do not contribute to the average. This correlation test takes advantage of the third characteristic of an observed reticle, namely spatial correlation. It will be appreciated that in the preferred embodiment if spatial correlation does not exist between enabling regions in two consecutive sweeps, both enabling region addresses are discarded to enhance accuracy. Of course other correlation tests and schemes can be devised by those skilled in the art without departing from the spirit and scope of the present invention. The sweep location address of the reticle having a direction perpendicular to the direction of sweep is thus defined to be the average sweep address of all those enabling regions whose sweep location addresses are substantially correlated.

For the reticle having a direction parallel to the direction of sweep, apparatus is provided which generates a control signal to identify the particular sweep if the count accumulated by a clock counter during the duration of the enabling region is greater than a specified number. In addition to the sweep identity, the accumulated count is stored for comparison with the accumulated count of all other sweeps whose sweep identity is stored. The location of the reticle parallel to the direction of sweep is then defined to be the identity of the sweep having the greatest accumulated count.

It will be appreciated that while it is preferable to use a gated video signal to minimize memory requirements in cluttered observation scenes, such gating is not essential to the present invention. The essential steps of the method of the present invention thus discriminates first on the basis of video signal amplitude, second, compares the returned signal pulsewidth against a priori knowledge of what the pulsewidth of a reticle return should be, and finally utilizes the spatial correlation feature of the reticle return to eliminate any pixel location address which does not satisfy a defined correlation test. It will also be appreciated that reference to sweeping herein includes mechanical or electronic sweeping and refers essentially to the sequential interrogation of the individual pixel locations which cooperate to form the observation scene.

It is thus the general object of the present invention to provide a system for detecting and locating reticles superimposed upon an observation scene.

It is yet another object of the present invention to utilize the unique spatial characteristics of the reticle plus the range of possible locations to electronically determine the center of the reticle for use as a reference for tracking, for stabilizing scan-to-scan reticle location variations due to system drift errors, and to provide a means to blank the reticle signal return from the remainder of the observations scene.

It is another object of the present invention to provide a means of electronically locating the reticle to thereby align the optical sighting system with the tracking system referene to minimize misalignment errors.

It is yet another object of the present invention to provide an automatic reticle detection method and apparatus to allow continuous, automatic, closed loop alignment of the sighting reference coordinate system and the tracking coordinate system.

DETAILED DESCRIPTION OF THE DRAWINGS

A complete understanding of the present invention and the above and other objects an advantages thereof may be gained from a consideration of the following description of the preferred embodiments taken in conjunction with the accompanying drawings in which:

FIG. 5 is a block diagram illustrating an arrangement for implementing the pulse count method shown in FIG. 1a.

DETAILED DESCRIPTION OF THE PREFERRED EMBODIMENT

In electronically scanning to define an observation scene image, a sensor will generally sweep a successive number of times in one direction (hereinafter referred to as "azimuth") with each successive sweep having a slight angle change perpendicular to the direction of sweep (hereinafter referred to as "elevation") to define a plurality of video sweep signals. By combining a plurality of azimuth sweep signals at slightly differing elevation angles, an observation scene can be electronically constructed.

In order to automatically identify the location of the reticles superimposed on the observation scene, the present invention makes use of several substantially unique features of a reticle return signal compared to an observation scene return signals. These features include the fact that the reticle return signal will generally be known to occur in only certain regions of the observation scene; the reticle return will always give a uniform, high amplitude signal level; it will always have identifiable pulsewidth characteristics; and finally, the azimuth location of the reticle return signal in specific sweep signals will be substantially the same taking into account small reticle misalignment errors and width variations.

Utilizing these unique characteristics, the present invention provides a discriminating system capable of defining the azimuth and elevation location of a plurality of reticles in either the azimuth or elevation direction or, with certain modifications, reticles having both azimuth and elevation components. Of course, reference to "azimuth" and "elevation" herein will be understood as being relative to the direction of the sensor sweep.

Figure 1A:
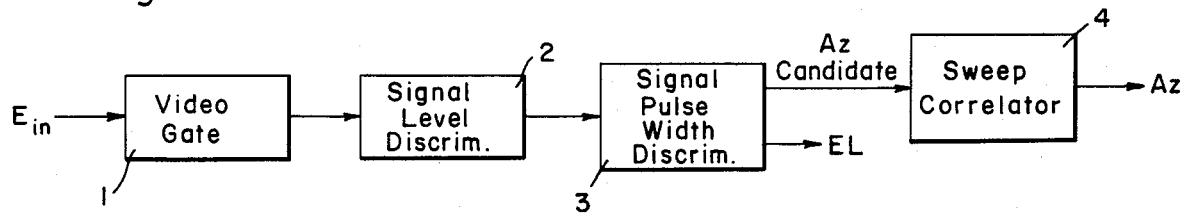
FIG. 1a is a block diagram illustrating the method utilized in the present invention.

Referring to FIG. 1a, there is shown a simplified functional block diagram illustrating one embodiment of the present invention which may be utilized in certain special cases where clutter does not greatly corrupt the observation scene and elevation ranking is not essential to identify the reticle with a high degree of certainty. In FIG. 1a, sweep signal $E_{in}$ is input to video gating means 1 to define a search region of the observation scene within which the reticle is known to reside. The gated sweep signal output is then input to signal level discriminating means 2 which allows only those portions of the gated sweep signal having amplitude levels substantially equal to the amplitude level of a reticle return signal (i.e., within a normal amplitude uncertainty range) to pass. The resultant processed signal thus contains enabling regions corresponding to the substantially equal amplitude reticle return signals.

The resultant processed signals are further processed in signal pulsewidth discrimination means 3 which identifies those enabling regions (i.e. enabling pulse periods) within the processed signal which have pulsewidth characteristics corresponding to the pulsewidth of the particular azimuth or elevation reticle being sought. In the embodiment illustrated in FIG. 1a, the reticle azimuth location may be determined by correlating candidate signal azimuth location in successive sweeps in sweep correlation means 4. Thus, if the candidate signal azimuth locations of the enabling regions in two successive sweep signals are substantially the same (within some predefined error factor), then a positive sweep correlation result will be obtained. While the reticle azimuth location could be chosen on the basis of the first positive correlation between successive signal azimuth locations, it is preferred to average all correlated candidate signal azimuth locations in the plurality of sweep signals which make up the observation scene.

The reticle elevation location may be determined from signal pulsewidth discrimination means 3 by testing the pulsewidth of the resultant processed signal enabling region and defining the reticle elevation location to overlay that sweep signal having an enabling region pulsewidth greater than some predetermined value chosen to prevent a spurrous or incorrect reticle elevation location.

Figure 1B:
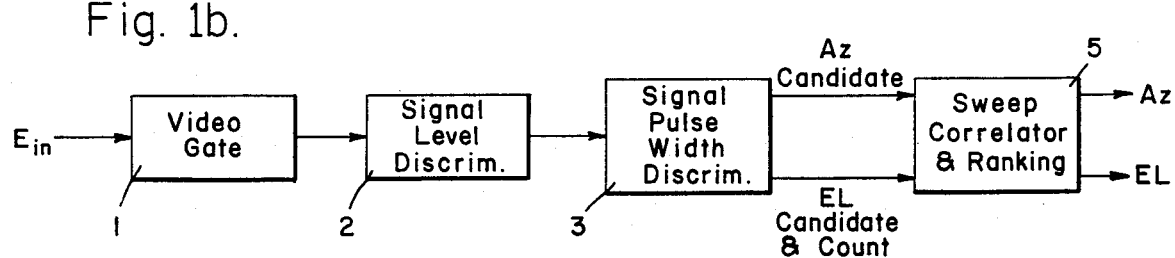
FIG. 1b is a simplified block diagram illustrating the preferred method disclosed by the present invention including sweep elevation location ranking.

An alternative preferred method of establishing the reticle elevation location is illustrated in FIG. 1b where the pulsewidth of the resultant processed signal enabling regions in each sweep are measured and a signal elevation location tentatively identified if the enabling region pulsewidth is greater than a predetermined amount. Each signal elevation location and a measure of its associated enabling region pulsewidth is then input to sweep correlation and ranking means 5 wherein apparatus is provided to define the reticle elevation location to be the location of the sweep signal having the greatest process signal enabling region pulsewidth. Sweep correlation and ranking means 5 processes the various azimuth locations in the same way as was previously described for the embodiment of FIG. 1a to obtain an "average" reticle location address.

Figure 2:
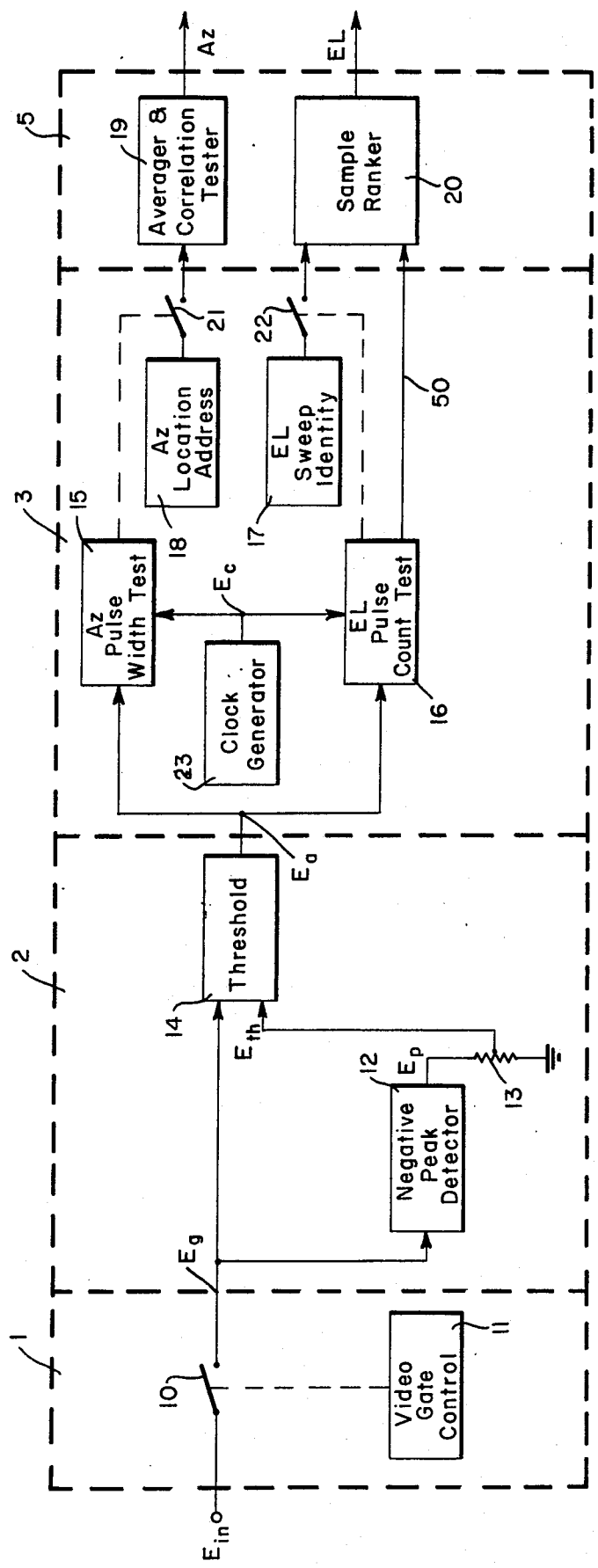
FIG. 2 is a detailed block diagram showing the preferred apparatus for implementing the steps illustrated in FIG. 1b.

Referring to FIG. 2, there is shown a preferred embodiment of the present invention corresponding to the simplified block diagram of FIG. 1b. In FIG. 2, the sweep signal input $E_{in}$ is coupled to enabling switch 10 in video-gating means 1 to form a gated sweep signal output $E_g$. Video signal enabling switch 10 is controlled by video-gate control 11 which opens and closes switch 10 to allow for reticle searching in only selected regions of the observation scene. The gates sweep signal is input to threshold means 14 and negative peak detector 12 in signal level discrimination means 2. Negative peak detector 12 generates a constant voltage level $E_p$ which is equal to the peak value of the gated sweep signal $E_g$. This contant voltage level output is coupled to ground through variable resistor 13. A voltage $E_{th}$ representing a selected fraction of the peak voltage $E_p$ is taken from variable reistor 13 and coupled to thresholding means 14 wherein the gated sweep signal $E_g$ is compared with constant threshold voltage $E_{th}$ to form a processed signal $E_a$ having enabling regions which correspond to those regions of the gated sweep signal $E_g$ which exceed the constant threshold voltage $E_{th}$. Of course, various other means of signal level discrimination may be devised to select, for example, only those regions of the gated sweep signal which fall within a region about the constant threshold voltage $E_{th}$ or below the constant threshold voltage $E_{th}$. In addition, other methods for generating a processed signal having enabling regions corresponding to regions where the reticle signal occurs will be apparaent to those skilled in the art.

The enabling regions of the process signal from signal level discriminating means 2 are received by azimuth pulsewidth testing means 15 and elevation pulse count testing means 16 in signal pulsewidth discrimination means 3. Clock 23 generates a clock pulse signal $E_c$ which is also coupled to azimuth pulsewidth test means 15 and elevation pulse count test means 16. In the preferred embodiment, azimuth pulsewidth test means 15 generates a first control signal wherever an enabling region of the process signal $E_a$ has a duration less than a predetermined pulsewidth. The first control signal closes switch 21, located between sweep location address generator 18 and address averager and correlation tester 19, to thereby transfer the corresponding sweep azimuth location to address averager and correlator 19. At the end of the plurality of sweeps representing an observation scene, an average location of all correlated enabling regions in process signal $E_a$ is output as the location of the azimuth reticle.

To define the location of the reticle having a direction substantially parallel to the direction of sensor sweeping, processed signal $E_a$ is input to elevation pulse count testing means 16 which generates a control signal to close switch 22 when the enabling region in the processed signal $E_a$ is greater than a predetermined amount as indicated by the total number of clock pulses occurring within the enabling region. Switch 22 is coupled between the elevation sweep identification means 17 and the sample ranker 20. Also coupled to sample ranker 20 is the clock signal $E_c$ from clock generator 23. When switch 22 is closed, the elevation identity of the particular azimuth sweep (hereinafter referred to as the elevation sweep identity) is input and a clock counter within sample ranker 20 is enabled. When switch 22 is again opened, the elevation sweep identity and the associated clock counter accumulated count are stored. The accumulated count for each elevation identity is then ranked by sample ranker 20 so that at the end the plurality of azimuth sweeps comprising the observation scene, the elevation identity of the sweep having the greatest accumulated clock pulse count is read out as the elevation reticle location.

Of course, it will be appreciated that numerous variations of the present invention are possible and will be recognized by those skilled in the art. For example, video gating means 1 may be eliminated entirely and the entire observation scene searched. This technique may be utilized to facilitate searching for reticles placed upon the observation scene in a grid pattern wherein there are multiple azimuth and multiple elevation reticles. It should be noted that if grid reticles are to be detected, averager and correlation tester 19 and sample ranker 20 will have multiple storage capabilities and may be arranged to operate within specified portions of the observations scene to assure that all grid lines are detected.

Alternatively, if grid reticles are to be detected, video gate control 11 may be programmed to open and close enabling switch 10 in the various regions of the observation scene in which a grid reticle is expected. In such a scheme, averager and correlation tester 19 and sample ranker 20 would be arranged to detect the reticles separately within each enabled region.

Figure 4A:
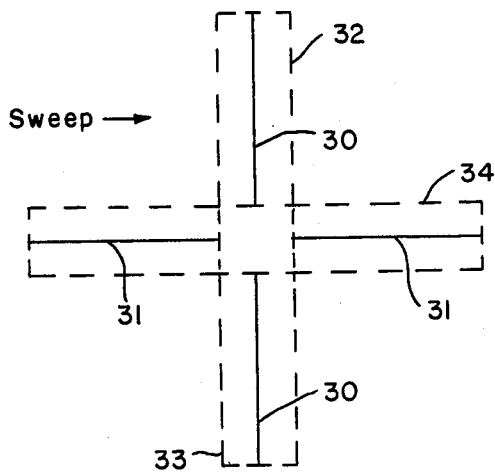
FIG. 4a and FIG. 4b illustrate two reticle patterns and the respective video gating regions which may be utilized.
Figure 4B:
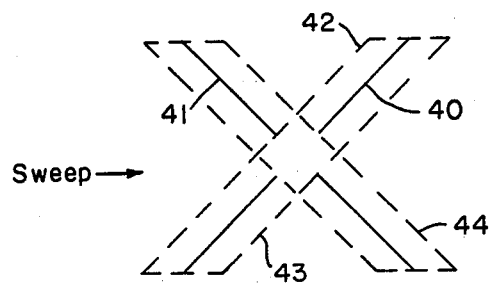

Video gate control 11 may also be utilized to define search regions which are not substantially perpendicular or parallel to the direction of sensor sweep. Thus, in FIG. 4a observation scene regions 32, 33, and 34, which are perpendicular parallel to the direction of sensor sweeping, may be defined by selectively opening and closing enabling switch 10 in response to a prior information of the appropriate location of the reticles 30 and 31. In FIG. 4b, however, video gate control 11 is programmed to define searching regions 42, 43 and 44 within which reticles 40 and 41 occur. Reticles 40 and 41 have both azimuth and elevation compliments relative to the direction of sensor sweep. To detect these reticles and to output an azimuth and elevation component for each reticle, it would be necessary to appropriately program averager and correlation tester 19 to anticipate and correlate the enabling regions in the process signal $E_a$ having values along the predefined direction of the reticles shown. It will be appreciated, of course, that sample ranker 20 and elevation pulse count testing means 16 and switch 22 and elevation sweep identification means 17 would not be necessary in such an embodiment because these devices sense only those reticles having a direction substantially parallel to the direction of sensor sweep and neither reticle as shown in FIG. 4b has such a direction.

Figure 5:
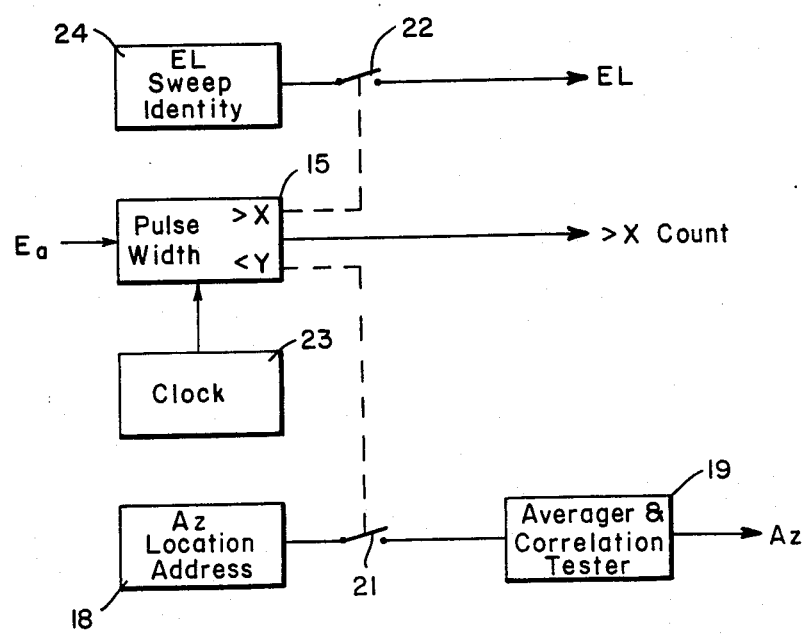

Various techniques may also be utilized in discriminating the azimuth and elevation reticle locations using signal pulsewidth discrimination method. For example, in FIG. 5 a signal pulsewidth discrimination means 3 and sweep correlation means 4 compatible with the simplified block diagram shown in FIG. 1a may be utilized. The processed signal $E_a$ having enabling regions is input to pulsewidth detection means 15 which closes switch 22 if the pulsewidth is greater than a specified value X and closes switch 21 if the pulsewidth is less than a specified value Y. The pulsewidth is again determined by the number of clock pulses inputted from clock generator 23 occurring during the enabling regions of the processed signal $E_a$. When switch 22 is closed, the elevation identity is output immediately to define the elevation reticle location. In order to minimize errors utilizing this method, it is necessary to choose a value of X sufficiently large to assure that the enabling region represents a reticle and not a feature of the observation scene. At the same time, the value of X must not be chosen so large as to fail to identify the elevation reticle if slight misalignment prevents the reticle from being exactly parallel with the direction of sensor sweep. The actual count accumulated may also be output as shown by the >X count output terminal although this is not necessary if the above method is utilized to determine the reticle location.

The azimuth reticle location is determined by averaging and correlation tester 19 which averages the correlated sweep location addresses stored when switch 21 is closed. The value of Y which allows the control signal closing switch 21 to be generated is chosen based upon a prior knowledge of the approximate pulsewidth of a typical signal return from the reticle and is essentially equivalent to the azimuth reticle location means shown in FIG. 2.

Figure 6:
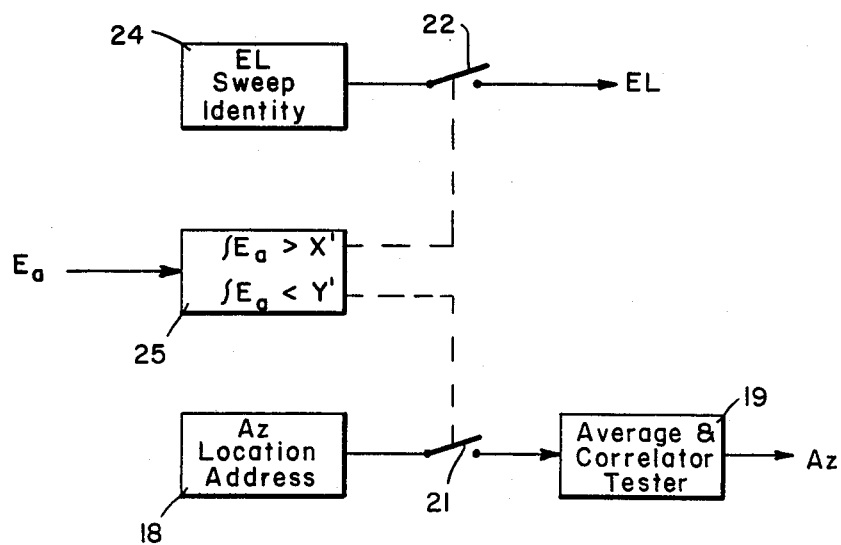
FIG. 6 is a second arrangement for implementing the signal pulsewidth discrimination means and sweep correlation means of FIG. 1a utilizing an integrator.

An alternative method for controlling switches 21 and 22 to define the azimuth reticle location and the elevation reticle location is shown in FIG. 6 wherein the pulsewidth generating means and clock are replaced by integrator 25 which integrates the process signal $E_a$ during the enabling time. Thus, switch 22 is closed if the integral of the enabling region of the process signal $E_a$ is greater than some predetermined value X' where X' is chosen large enough to assure that only the elevation reticle location will be chosen but small enough that an elevation reticle will be detected. Switch 21 is closed if the integral of the enabling region of the processed signal $E_a$ is less than a predetermined value Y'. Again, the value of Y' is chosen to be sufficiently small to eliminate those enabling regions having a pulsewidth greater than a predetermined value known to represent the approximate value of the enabling region pulsewidth occurring when a reticle signal return exists.

Figure 7:
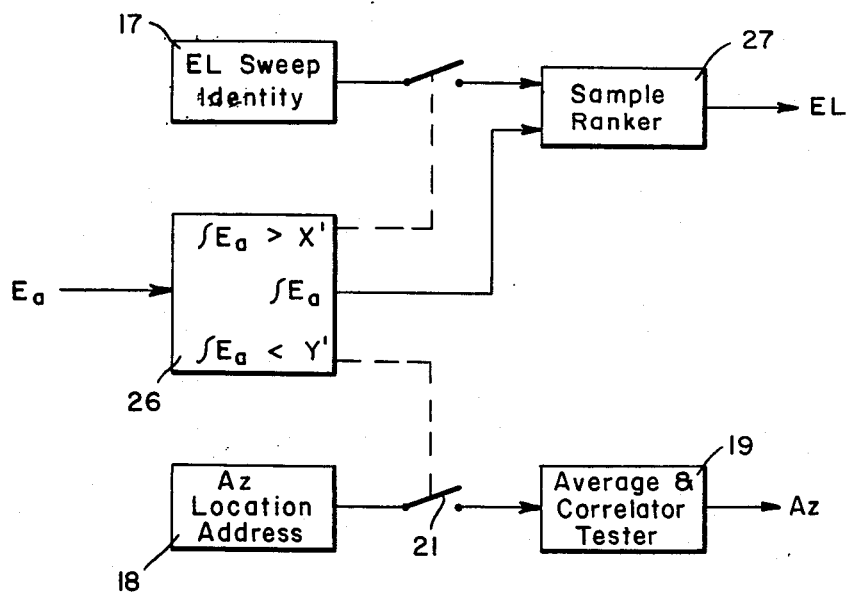
FIG. 7 is an arrangement for implementing the signal pulsewidth discrimination means and sweep correlation and ranking means of FIG. 1b utilizing an integrator.

FIG. 7 illustrates yet another alternative means for determining the reticle's azimuth and elevation in which the processed signal $E_a$ is input to integrator 26 which operates identically to integrator 25 described in conjunction with FIG. 6. However, in addition to switch control signals 21 and 22, the value of the integral $E_a$ is generated and coupled into sample ranker 27, where it is associated with the elevation sweep identity transferred into sample ranker 27 when switch 22 is closed. The observation scene elevation sweep identity having the greatest value of integral $E_a$ in sample ranker 27 is then defined to be the elevation reticle location. This method is preferred over the method described in conjunction with FIG. 6 because the higher probability that the actual reticle will be detected. It will be appreciated, of course, that the embodiments and modifications described are illustrative only and those skilled in the art will be able to understand and devise other processing criteria to identify azimuth and elevation reticle locations utilizing pulsewidth discrimination in accordance with the present invention.

Figure 3:
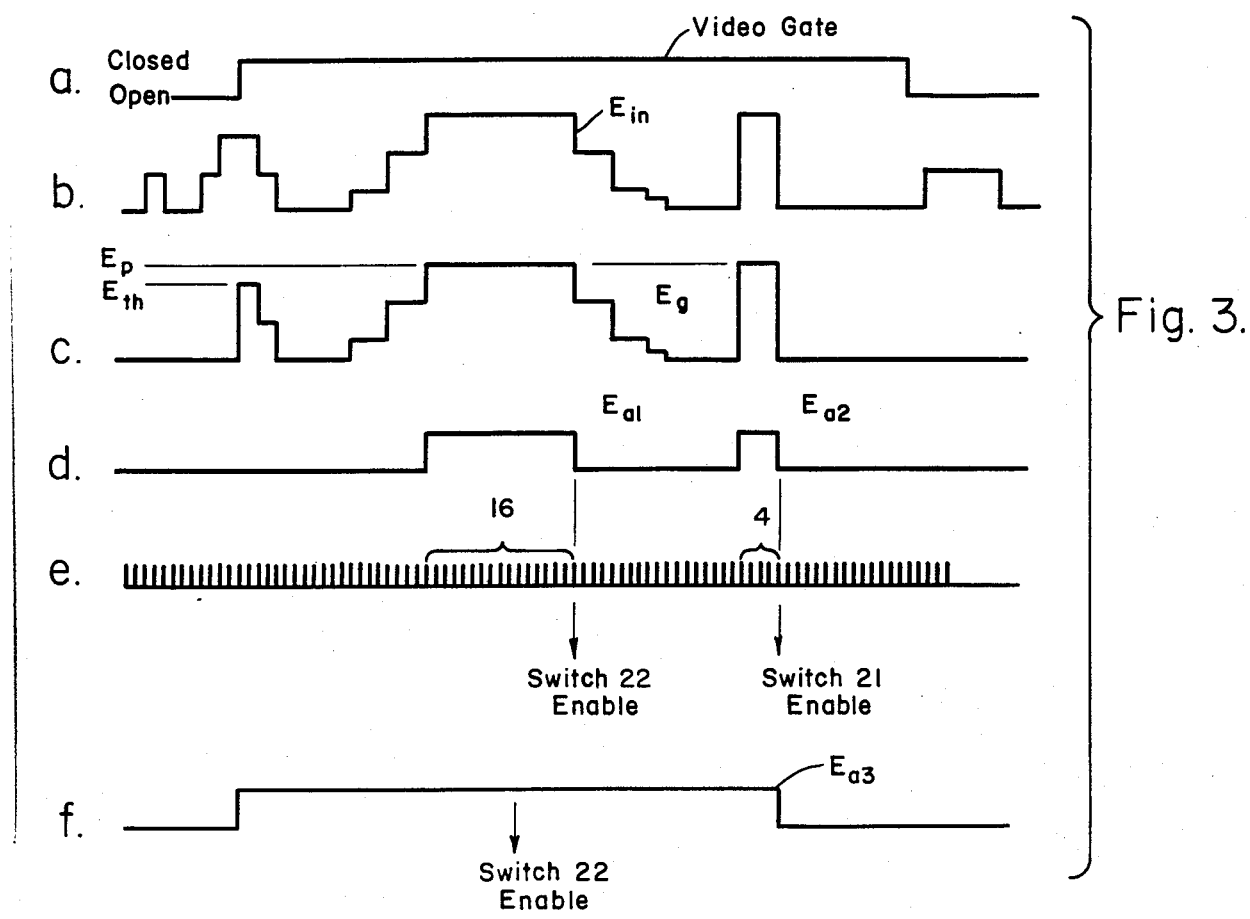
FIG. 3a to 3f are timing diagrams illustrating the signals at various locations in the block diagram of FIG. 2.

The operation of the present invention may be understood more fully by reference to FIG. 3 which, when utilized in conjunction with the block diagram of FIG. 2, illustrates the operation of the present invention. A video sweep signal $E_{in}$ such as that shown in FIG. 3b is input to video gating means 1. While the illustrative video input signal $E_{in}$ is shown as a discretized signal, it will be appreciated that the input signal may also be analog. Enabling switch 10 is opened and closed in response to the control signal from video gate control 11 in accordance with FIG. 3a to produce gated video signal $E_g$ shown in FIG. 3c. The gated video signal $E_g$ is coupled into negative peak detector 12 to define the maximum voltage level of the gated video signal shown in FIG. 3c as voltage $E_p$. A constant voltage $E_{th}$, which is a predetermined fraction of the negative peak detector voltage $E_p$, is taken from the variable resistor 13 to allow for detection of gated video signal regions having an amplitude slightly less than the maximum amplitude. This allows for uncompensated variations in the signal return from the reticle.

The video gated signal $E_g$ is compared to the threshold voltage $E_{th}$ in thresholding means 14 to obtain a processed signal $E_a$ having enabling regions such as those identified as $E_{a1}$ and $E_{a2}$ shown in FIG. 3d. If the width of the enabling region representing a reticle return is determined to be no more than, for example, four clock pulses, then azimuth pulsewidth test 15 will generate an enable signal to close switch 21 only upon the second enabling region $E_{a2}$. The sweep location address is then transferred from sweep location address means 18, which is either coupled to or correlated with the sensor sweep control, into averager and correlation tester 19. Preferably, averager and correlation tester 19 stores this sweep location address. If on the next sweep another sweep location address is transferred to averager and correlation tester 19, which correlates with the first sweep location address, an average address is generated and stored. However, if the sweep location addresses are significantly different, correlation does not occur and neither sweep location address is allowed to contribute further to the average sweep location address. By so discarding all potentially erroneous addresses, accuracy is enhanced since only one good address is sufficient even if all other addresses in all signal sweeps are ignored.

Referring now to FIGS. 3d, 3e and 3f, the elevation pulse count test, shown in FIG. 2, generates a control signal to close switch 22, if an enabling region is sufficiently long to allow more than, for example, 15 clock pulses, to be accumulated. When switch 22 is closed, the identity of the elevation sweep transfers from elevation sweep identification means 17 to sample ranker 20 and the clock pulses occurring after switch 22 is closed will begin to accumulate in elevation pulse count tester 16. In the present example of FIG. 3d, the enabling region $E_{a1}$, encompassing 16 clock pulses, will cause switch 22 to close after the 15th clock pulse and pulse count tester 16 will accumulate a count of one before the enabling region ends. That count will then transfer to sample ranker 20 through coupling line 50. The enabling region $E_{a2}$, which encompasses only 4 clock pulses, will not cause switch 22 to close since a minimum of 15 clock pulses are necessary.

If on some subsequent sweep, an enabling region such as that shown in FIG. 3f and identified as $E_{a3}$ occurs, switch 22 will close transferring the elevation sweep identity into sample ranker 20 at the end of the 15th clock pulse. Thereafter, elevation pulse count tester will accumulate clock pulses from clock generator 23 for transfer to sample ranker 20 until the enabling region ends. Clearly, the number of clock pulses accumulated by elevator pulse count tester 16 and transferred to sample ranker 20 for enabling region $E_{a3}$ will be greater than the number of clock pulses accumulated for enabling region $E_{a1}$ shown in FIG. 3d. Thus, sample ranker 20 will select the elevation sweep identity corresponding to enabling region $E_{a3}$ as the elevation reticle location if a greater accumulated count does not occur in a subsequent azimuth sweep. It will be appreciated of course, that the counting may occur in sample ranker 20 without departing from the operation of the present invention.

While the present invention has been particularly described with reference to etched reticles in the visible spectrum, it will be appreciated that reticles may be heated wires in an infrared detection system or any type reticle detectable by the particular sensor utilized. In addition, the teachings and apparatus of the present invention may be arranged to detect a single reticle in any direction of the scene. Of course, it will be understood by those skilled in the art that the foregoing and other changes in form and details may be made without departing from the spirit and scope of the invention.

What is claimed is:

1. A reticle locating system for discriminating between an observation scene image having a plurality of pixel location addresses associated therewith and at least one superimposed reference reticle and defining a pixel location address for the reticle wherein said observation scene image is formed by a plurality of sweeps across the observation scene to form a plurality of video signals, one video signal being formed for each sweep, said reticle locating system comprising:
    (a) means for receiving and processing said video signals to form a processed signal associated with each video sweep, with a plurality of said processed signals having at least one enabling pulse period defined by a portion of the video signal having an amplitude value indicating that the video signal return is generated by said reticle;
    (b) means for identifying a pixel location address for each enabling pulse period having a time duration less than a first value, and
    (c) means for averaging the identified pixel location addresses in all sets of consecutive video signals having substantially correlated pixel location addresses within each set and substantially correlated pixel location addresses between sets to obtain an average pixel location address to thereby define a pixel location address for said reference reticle.

2. The reticle locating system of claim 1 further comprising video gating means for selectively passing portions of said video signals to said means for receiving and processing to thereby define a search domain in said observation scene image.

3. The reticle locating system of claim 1 wherein said means for receiving and processing comprises:
    (a) peak detection means coupled to receive said video signals and generate at a peak detector output a peak detection value substantially equal to the maximum amplitude of said video signals,
    (b) a preset voltage divider coupled between the peak detector output and ground and having a voltage output terminal whereby a threshold voltage level equal to a selected fraction of the peak detection value is taken from said voltage output terminal, and
    (c) thresholding means coupled to receive said video signals and said threshold voltage level and generate the processed signal at the output of said thresholding means.

4. The reticle locating system of claim 1 wherein said pixel location address identifying means comprises:
  (a) clock generation means for generating a clock pulse signal,
  (b) pulsewidth testing means coupled to receive said clock pulse signal and said processed signal and adapted to generate a first command signal if the number of clock pulses occurring during the enabling pulse periods is less than a predetermined value,
  (c) pixel location address generation means for defining one pixel location address for each enabling pulse period in said processed signal, and
  (d) a switch coupled to the output of said pixel location address generation means for outputting said pixel location address in response to said first command signal.

5. A reticle locating system for discriminating between an observation scene image and at least one superimposed reference reticle wherein said observation scene image is formed by sweeping a sensor across the observation scene in a scanning pattern to generate a plurality of video signals each of said video signals representative of the sensed video from one line of said scanning pattern, said direction of sweeping being in a first coordinate direction where said reference reticle is in a direction substantially parallel to said first coordinate direction, said reticle locating system comprising:
  (a) means for receiving and processing each of said video signals to form a processed signal associated with each sweep, with a plurality of said processed signals having at least one enabling pulse period defined by a portion of the video signal having an amplitude value indicating that the video signal return is generated by said reference reticle, and
  (b) means for identifying a coordinate value of the line of the sensed video having the greatest enabling pulse period to thereby define the sweep having the video signal return generated by said reticle and therefrom defining the coordinate location of said reference reticle in a second coordinate direction orthogonal to said first coordinate direction.

6. The reticle locating system of claim 5 further comprising video gating means for selectively passing portions of said video signals to said means for receiving and processing to thereby define a search domain in said observation scene image.

7. The reticle locating system of claim 5 wherein said means for receiving and processing comprises:
  (a) peak detection means coupled to receive said video signals and generate at a peak detector output a peak detector value substantially equal to the maximum amplitude of said video signals,
  (b) a preset voltage divider coupled between the peak detector output and ground and having a voltage output terminal whereby a threshold voltage level equal to a selected fraction of the peak detector value is taken from said voltage output terminal, and
  (c) thresholding means coupled to receive said video signals and said threshold voltage level and generate the processed signal at the output of said thresholding means.

8. The reticle locating system of claim 5 wherein said means for identifying comprises:
  (a) clock generation means for generating clock pulses,
  (b) pulse count testing means coupled to receive said clock signal and said processed signal and adapted to generate a command signal if the number of clock pulses occurring during each enabling pulse period of said processed signal is greater than a predetermined value,
  (c) coordinate association means coupled to said pulse count testing means to define a coordinate value along said second coordinate direction for each line of said scanning pattern, and
  (d) switching means coupled to the output of said coordinate association means and activated by said command signal to cause each of said defined coordinate values to be outputted when the command signal from said pulse count testing means occurs,
  (e) sample ranking means coupled to said clock generation means and adapted to receive the coordinate values in said second coordinate direction and accumulate said clock pulses during at least a defined portion of said enabling pulse period, said sample ranking means adapted to store said coordinate values and the associated accumulated clock count for each video signal sweep and output the coordinate value in the second coordinate direction of the observation scene having the greatest accumulated count associated therewith to thereby define the coordinate location of the reticle in said second coordinate direction.

9. A reticle locating system for discriminating between an observation scene image and a plurality of superimposed reference reticles wherein said observation scene image is formed by a plurality of video signals, each video signal formed by one sweep by a sensor across said observation scene, wherein each of said plurality of video signals has a unique sweep location coordinate value in a first coordinate direction, and each video signal has a plurality of pixel location addresses along a second coordinate direction, said reticle locating system comprising:
  (a) means for receiving and processing said video signals to form a processed signal associated with each sweep with a plurality of said processed signals having at least one enabling pulse period defined by the portions of the video signal having an amplitude value indicating that the video signal return is generated by said reticle,
  (b) means coupled to receive said processed signal for identifying a pixel location address for each enabling pulse period having a time duration less than a first value,
  (c) means coupled to said means for identifying for averaging the identified pixel location addresses in all sets of consecutive video signals having substantially correlated pixel location addresses within each set and substantially correlated pixel location addresses between sets to obtain an average pixel location address for each of said reticles in said second coordinate direction, and
  (d) means coupled to said means for receiving and processing for identifying a coordinate value of each processed signal having an enabling pulse period greater than a second value to thereby define the sweep location coordinate of each of said reticles along said first coordinate direction.

10. The reticle locating system of claim 9 further comprising video gating means for selectively passing portions of said video signals to said means for receiving and processing to thereby define a search domain in said observation scene image.

11. The reticle locating system of claim 9 wherein said means for receiving and processing said signal sweeps comprises:
 (a) peak detection means coupled to receive said video signals and generate at a peak detector output a peak detector value substantially equal to the maximum amplitude of said video signals,
 (b) a preset voltage divider coupled between the peak detector output and ground and having a voltage output terminal whereby a threshold voltage level equal to a selected fraction of the peak detector value is taken from said voltage output terminal, and
 (c) thresholding means coupled to receive said video signals and said threshold voltage level and generate the processed signals at the output of said thresholding means.

12. The reticle locating system of claim 9 wherein said means for identifying a pixel location address comprises:
 (a) clock generation means for generating a clock pulse signal,
 (b) pulsewidth testing means coupled to receive said clock pulse signal and said processed signal and adapted to generate a first command signal if the number of clock pulses occurring during the enabling pulse period is less than a first value and to generate a second command signal if the number of clock pulses occurring during the enabling pulse period is greater than a second value,
 (c) pixel location address generation means for defining one pixel location address of each enabling pulse period in said processed signal in said second coordinate direction, and
 (d) a first switch coupled to the output of said pixel location address generation means for causing a pixel location address to be outputted in response to said first command signal, and said means for identifying a coordinate value comprises:
 (e) coordinate association means coupled to said pulsewidth testing means to define a sweep location coordinate value along said first coordinate direction for each video signal; and
 (f) a second switch coupled to the output of said coordinate association means to cause the sweep location coordinate value to be outputted in response to the second command signal from said pulsewidth testing means.

13. The reticle locating system of claim 12 further comprising sample ranking means coupled to said clock and to said coordinate association means to receive said sweep location coordinate values and accumulate said clock pulses when said second switch is closed, said sample ranking means adapted to output the sweep location coordinate value of the video signal in said observation scene having the greatest accumulated count associated therewith to thereby identify the sweep location coordinate of the reticle along said first coordinate direction.

14. A method of locating and discriminating between an observation scene image and at least one superimposed reference reticle wherein said observation scene image is formed by a plurality of video signals generated by sweeping a sensor across said observation scene in a first coordinate direction, said observation scene having a plurality of pixel location addresses along the first coordinate direction, said method of locating the reticle comprising the steps of:
 (a) processing said video signals to form one processed signal associated with each video signal and having enabling periods coorresponding to those portions of said video signals falling within a predefined voltage range which indicate that the video signal return is generated by said reference reticle;
 (b) identifying a pixel location address for each enabling period within the observation scene image which has a time duration within a predetermined range of values; and
 (c) comparing the pixel location addresses of the identified enabling periods of step (b) to establish if any set of enabling region pixel location addresses are correlated according to a predefined correlation scheme and defining a reticle location to exist and be equal to a composite value of said set of correlated enabling period pixel location addresses.

15. The locating and discriminating method of claim 14 further comprising an initial step of gating said video signal to enable processing of step (a) in only selected regions of the observation scene.

* * * * *